United States Patent
Warren et al.

(10) Patent No.: US 10,481,047 B2
(45) Date of Patent: Nov. 19, 2019

(54) APPARATUS AND METHOD FOR TESTING A LINEAR ACUATOR

(71) Applicant: Airbus Operations Limited, Bristol (GB)

(72) Inventors: Nicky Steven Warren, Bristol (GB); David Fussell, Bristol (GB); Daniel Bennett, Bristol (GB)

(73) Assignee: Airbus Operations Limited, Bristol (GB)

( * ) Notice: Subject to any disclaimer, the term of this patent is extended or adjusted under 35 U.S.C. 154(b) by 72 days.

(21) Appl. No.: 15/825,747

(22) Filed: Nov. 29, 2017

(65) Prior Publication Data

US 2018/0156696 A1 Jun. 7, 2018

(30) Foreign Application Priority Data

Dec. 2, 2016 (GB) .................................. 1620529.6

(51) Int. Cl.
*G01M 13/00* (2019.01)
*F15B 19/00* (2006.01)
(Continued)

(52) U.S. Cl.
CPC ........... *G01M 99/008* (2013.01); *B64C 13/38* (2013.01); *B64F 5/60* (2017.01); *F15B 19/00* (2013.01);
(Continued)

(58) Field of Classification Search
CPC ....... B64C 13/08; B64C 13/42; B64C 13/503; B64C 2201/146; B64C 13/24;
(Continued)

(56) References Cited

U.S. PATENT DOCUMENTS 3,229,510 A 1/1966 Bodemeijer
8,080,772 B2 * 12/2011 Geck ....................... F42B 10/64
244/3.1
(Continued)

FOREIGN PATENT DOCUMENTS

CN 105298988 2/2016
CN 105927617 9/2016
(Continued)

OTHER PUBLICATIONS

Combined Search and Examination Report for GB 1620529.6, dated Jun. 2, 2017, 5 pages.

*Primary Examiner* — Brandi N Hopkins
(74) *Attorney, Agent, or Firm* — Nixon & Vanderhye P.C.

(57) ABSTRACT

An apparatus for in-situ testing of a linear actuator configured to exert an actuation force in an actuation direction by movement of a first part of the actuator relative to a second part of the actuator. The apparatus includes a test device, a test actuator and a measurement device. The test device includes a first surface configured to contact the first part of the actuator, and a second surface configured to contact the second part of the actuator. The second surface is moveable relative to the first surface to alter a distance therebetween. The test actuator is configured to exert a test force in a direction opposite to the actuation direction, the test force being to drive movement of the second surface away from the first surface. The measurement device is for detecting a change in the distance between the first surface and the second surface.

19 Claims, 7 Drawing Sheets

(51) Int. Cl.
  *B64C 13/38* (2006.01)
  *G01M 99/00* (2011.01)
  *B64F 5/60* (2017.01)

(52) U.S. Cl.
  CPC ..... *G01M 13/00* (2013.01); *F15B 2211/7051* (2013.01); *F15B 2211/855* (2013.01)

(58) Field of Classification Search
  CPC ......... B64C 13/50; B64C 13/00; Y10T 74/20; Y10T 74/184; Y10T 74/1836; G03F 7/70725; G03F 7/70758; F16H 21/44; F16H 21/12
  See application file for complete search history.

(56) References Cited

U.S. PATENT DOCUMENTS

| | | | | |
|---|---|---|---|---|
| 2006/0255207 | A1* | 11/2006 | Wingett | B64C 13/00 244/99.4 |
| 2007/0018040 | A1* | 1/2007 | Wingett | B64C 13/00 244/99.4 |
| 2008/0116317 | A1* | 5/2008 | Steinberg | B64C 13/30 244/99.3 |
| 2014/0260722 | A1 | 9/2014 | Kopp et al. | |
| 2014/0373608 | A1* | 12/2014 | Bellemare | G01N 3/46 73/82 |

FOREIGN PATENT DOCUMENTS

| | | |
|---|---|---|
| WO | 02/096751 | 12/2002 |
| WO | WO 2015/156681 | 10/2015 |

\* cited by examiner

Fig. 1a

Prior Art

APPARATUS AND METHOD FOR TESTING A LINEAR ACUATOR

RELATED APPLICATION

This application claims priority to United Kingdom Patent Application 1620529.6 filed Dec. 2, 2016, the entirety of which is incorporated by reference.

TECHNICAL FIELD

The present invention relates to an apparatus for in-situ testing of a linear actuator; an apparatus in combination with a linear actuator; and a method of testing a linear actuator in-situ.

BACKGROUND

Aircraft spoilers are typically actuated by linear actuators. When an aircraft is cruising, the airflow over the wing exerts a suction force on the spoilers, which (if not resisted) would cause the spoilers to lift away from the upper surface of the wing. This would disrupt the aerodynamic profile of the wing, and would consequently reduce the fuel efficiency of the aircraft. The spoiler actuators are therefore arranged to resist this suction force and hold the spoilers in a fully retracted configuration whilst the aircraft is cruising.

Over time, a spoiler actuator may become less effective at holding the spoiler down against the aerodynamic suction force (e.g. because they are in need of maintenance or replacement). This may not affect the actuators ability to deploy and position the spoiler when deployed, so it may not be noticed by flight or ground crew. However; it can negatively impact the fuel efficiency of the aircraft, as described above, and so it is desirable to detect when a spoiler actuator has become less effective at holding the spoiler in the fully retracted position.

Known techniques for testing the operation of linear actuators cannot be performed on an actuator which is installed on an aircraft. Instead, the actuator must be removed from the aircraft for testing. This makes such techniques unsuitable for routine testing, such as would be necessary to detect relatively small decreases in actuator effectiveness.

SUMMARY

A first aspect of the present invention provides an apparatus for in-situ testing of a linear actuator which is configured to exert an actuation force in an actuation direction by movement of a first part of the linear actuator relative to a second part of the linear actuator. The apparatus comprises a test device, a test actuator and a measurement device. The test device comprises a first surface configured to contact the first part of the linear actuator during operation of the apparatus, and a second surface configured to contact the second part of the linear actuator during operation of the apparatus. The second surface is moveable relative to the first surface to alter a distance between the first surface and the second surface. The test actuator is configured to exert a test force in a direction opposite to the actuation direction when the apparatus is in use to test the linear actuator, the test force being to drive movement of the second surface away from the first surface. The measurement device is for detecting a change in the distance between the first surface and the second surface.

Optionally, the linear actuator comprises an extending arm, and the test device is configured to enclose a cross-section of the extending arm during operation of the apparatus to test the linear actuator.

Optionally, the test device comprises a load reaction component and a force generation component, and the first surface is comprised in the load reaction component and the second surface is comprised in the force generation component.

Optionally, the load reaction component is configured to react a maximum actuation force exertable by the linear actuator.

Optionally, the load generation component comprises one or more extendible members connected to the test actuator. The one or more extendible members may be in contact with the load reaction component such that loads can be transmitted from the load generation component to the load reaction component via the one or more extendible members. The one or more extendible members may be configured such that extension of the one or more extendible members increases the distance between the first surface and the second surface. The test actuator may be configured to drive extension of the one or more extendible members.

Optionally, the test actuator is configured to exert the test force according to at least one predetermined parameter. Optionally, the at least one predetermined parameter includes one or more of: a magnitude of the test force; a direction of the test force; a time period during which the test force is continuously exerted.

Optionally, the test actuator comprises a hydraulic actuator.

Optionally, the configuration of the first surface is arranged to match the configuration of a surface on the first part contacted by the first surface during operation of the actuator. Optionally, the configuration of the second surface is arranged to match the configuration of a surface on the second part contacted by the second surface during operation of the actuator.

Optionally, the measurement device is configured to measure a parameter relating to a distance between the first surface and the second surface. Optionally, the measurement device is configured to detect whether the measured parameter exceeds a predetermined threshold.

Optionally, the test actuator is configured to exert the test force continuously for a time period and the measurement device is configured to continuously measure the parameter during the time period. Optionally, the measurement device is further configured to determine a time at which the measured parameter exceeds the predetermined threshold. Optionally, the test actuator is configured to exert the test force continuously for a predetermined time period, and the measurement device is configured to measure the parameter at the end of the predetermined time period.

Optionally, the parameter is any one of: distance between the first surface and the second surface; distance between a first selected point on the test device and a second selected point on the test device; distance between a selected point on the first part of the linear actuator and a selected point on the second part of the linear actuator; degree of extension of the one or more extendible members; position of a selected point on the linear actuator; position of a selected point on the test device; position of a component of the test actuator.

A second aspect of the present invention provides an apparatus in combination with a linear actuator. The linear actuator comprises a first part moveably connected to a second part, and is configured to exert an actuation force in an actuation direction by movement of the first part relative to the second part. The apparatus comprises a test device, a test actuator, and a measurement device. The test device is mounted on the linear actuator such that in an activated configuration of the linear actuator a first surface of the test device contacts the first part of the linear actuator and a second surface of the test device, which is moveable relative to the second surface of the test device in the actuation direction, contacts the second part of the linear actuator. The test actuator is configured to exert a test force in a test direction opposite to the actuation direction, the test force being to drive movement of the second surface away from the first surface. The measurement device is for detecting a change in the distance between the first surface and the second surface.

Optionally, the actuation force is to reduce the distance between the first part of the linear actuator and the second part of the linear actuator, such that the actuation force compresses the test device.

Optionally, the linear actuator is configured to actuate a flight control surface of an aircraft. One of the first and second parts of the linear actuator may be connected to a fixed structure of an aircraft, and the other of the first and second parts of the linear actuator may be connected to the flight control surface.

Optionally, the apparatus is an apparatus according to the first aspect.

A third aspect of the present invention provides an aircraft comprising the apparatus in combination with a linear actuator according to the second aspect.

A fourth aspect of the present invention provides a method of testing of a linear actuator in-situ, wherein the linear actuator is configured to exert an actuation force in an actuation direction by movement of a first part of the linear actuator relative to a second part of the linear actuator. The method comprises:

providing a test device on the linear actuator such that, in an activated configuration of the linear actuator, a first surface of the test device contacts the first part of the linear actuator and a second surface of the test device contacts the second part of the linear actuator;

operating the linear actuator to exert the actuation force on the test device;

operating the test device to apply a predetermined test force in a direction opposite to the actuation direction, the test force being to increase the distance between the first surface and the second surface; and detecting a change in the distance between the first surface and the second surface.

Optionally, the method further comprises determining whether a detected change meets a predefined criterion. Optionally, the predefined criterion comprises one of: a minimum distance change during a predetermined time period; and a maximum time to reach a predetermined distance change.

BRIEF DESCRIPTION OF THE DRAWINGS

Embodiments of the invention will now be described, by way of example only, with reference to the accompanying drawings, in which.

DETAILED DESCRIPTION

The examples described herein relate to apparatus for in-situ testing of a linear actuator, in particular a linear actuator which is configured to exert an actuation force in an actuation direction by movement of a first part of the linear actuator relative to a second part of the linear actuator. The term "in-situ" is intended to indicate that the linear actuator is in an operational location during the testing, such that the actuator being tested is connected to two relatively moveable components of a further apparatus (e.g. an aircraft) and is able to cause the relative movement of those components during the testing. For example, if the linear actuator is an aircraft flight-control surface actuator, which the linear actuator is tested "in-situ", a first part of the linear actuator may be connected to a fixed structure of the aircraft and a second part of the linear actuator may be connected to the flight-control surface during the testing.

Figure 1A:
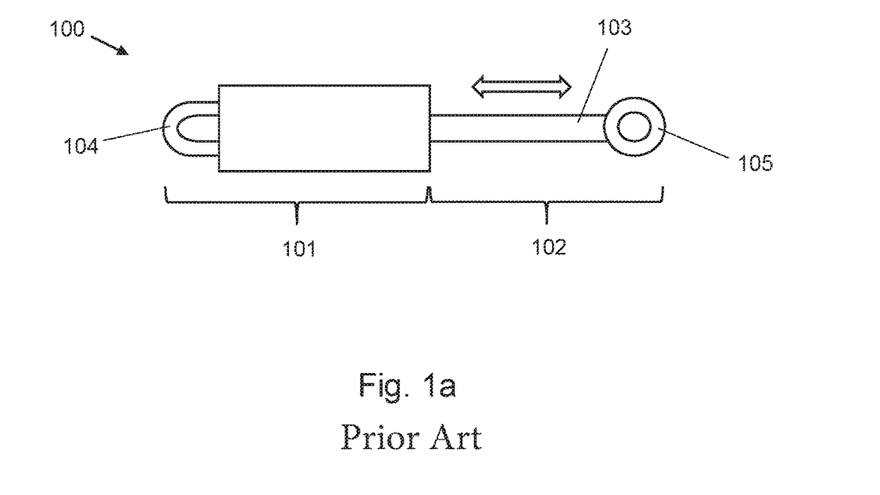
FIG. 1a shows a schematic view of an example linear actuator.

FIG. 1a shows an example linear actuator 100 which may be tested by an example apparatus according to the present invention. The linear actuator 100 comprises a first part 101 which is moveably connected to a second part 102. The first part 101 comprises a first mounting feature 104 for connecting the actuator to, e.g., a fixed structure capable of reacting the loads generated by operation of the actuator 100. The second part 102 comprises an extendible arm 103 which can extend and retract in the direction shown by the block arrow, and a second mounting feature 105. If the first mounting feature 104 is attached to a fixed structure, the second mounting feature 105 will be mounted to a moveable structure, movement of which is to be actuated by the linear actuator 100. It will be appreciated that it is equally possible for the second mounting feature 105 to be mounted to a fixed structure and the first mounting feature 104 to be mounted to a moveable structure. The first part 101 may comprise or be connected to a drive mechanism (not shown) such as a hydraulic cylinder, which is arranged to drive extension of the extendible arm 103. In some examples the linear actuator 101 may include a safety mode to by-pass the hydraulic operation of the actuator, even when experiencing a load acting to extend or retract the arm. In some examples the linear actuator 101 may comprise a state detection mechanism to detect a current state of extension of the extendible arm 103 (which is equivalent to a current relative position of the first and second mounting features 104, 105, and thus a current relative position of the structures to which the first and second mounting features 104, 105 are mounted). The linear actuator may be any type of linear actuator which is configured to exert an actuation force in an actuation direction by movement of a first part of the linear actuator relative to a second part of the linear actuator. The linear actuator 100 may be configured to exert a force in the range 10 ton to 20 ton. The linear actuator may be configured to exert a force of at least 15 ton. The linear actuator may be configured to actuate a flight control surface of an aircraft.

Figure 1B:
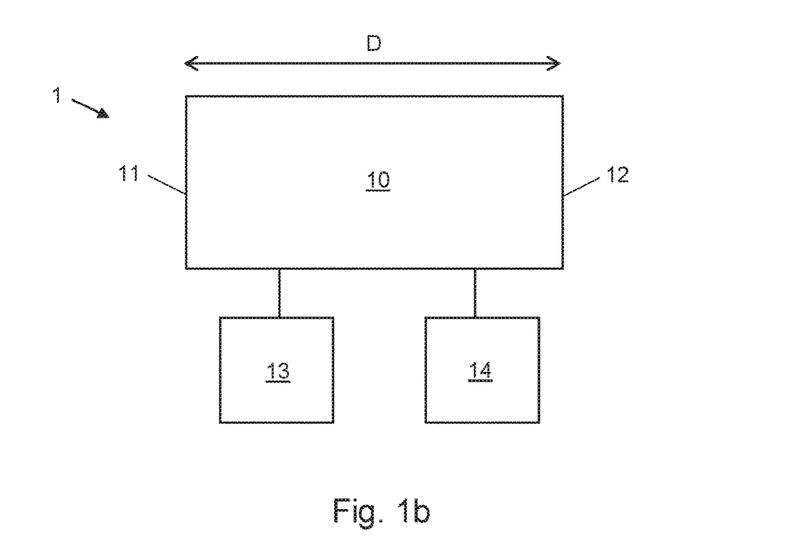
FIG. 1b shows a schematic view of a general example apparatus for in-situ testing of a linear actuator.

FIG. 1b shows a generalized example of an apparatus 1 for in-situ testing of a linear actuator, e.g. the linear actuator 100 of FIG. 1a. The example apparatus 1 comprise a test device 10, a test actuator 13, and a measurement device 14. The test device 10 comprises a first surface 11 which is configured to contact the first part 101 of the linear actuator 100 during operation of the apparatus 1, and a second surface 12 configured to contact the second part 102 of the linear actuator during operation of the apparatus 1. The second surface 12 is moveable relative to the first surface 11 to alter a distance D between the first surface 11 and the second surface 12. Relative movement of the first and second surfaces 11, 12 may be enabled, for example, by the test device comprising two parts connected by one or more extending arms, or by the test device having a telescopic construction. However, the test device 10 may have any suitable construction which permits relative movement of the first and second surfaces 11, 12.

The configuration of the first surface 11 may be arranged to match the configuration of a surface on the first part 101 of the actuator 100 contacted by the first surface 11 during operation of the apparatus 1. For example, the first surface 11 may include features such as recesses and/or protrusions which cooperate with corresponding protrusions and/or recesses on a surface of the first part 101 of the actuator 100, such that there is continuous contact between the first surface 11 and the first part 101 of the actuator across the whole area of the first surface 11. Such continuous contact may advantageously enable the loads generated by the apparatus 1 to be passed to the first part 101 of the actuator 100 without risk of damaging the first part 101. Similarly, the configuration of the second surface 12 may be arranged to match the configuration of a surface on the second part 102 of the actuator 100 contacted by the second surface 102 during operation of the actuator 100.

The test actuator 13 is configured to exert a test force in a direction opposite to the actuation direction of the linear actuator 100 when the apparatus 1 is in use to test the linear actuator 100. The test actuator 13 may be configured to exert a test force in the range 1 ton to 10 ton. The test actuator 13 may be configured to exert a test force in the range 5 ton to 7 ton. The test force is to drive movement of the second surface 12 away from the first surface 11.

In some examples the test actuator is configured to exert the force according to at least one predetermined parameter. The at least one predetermined parameter can include one or more of: a magnitude of the test force; a direction of the test force; a time period during which the test force is continuously exerted. A predetermined magnitude of the test force may be, for example, 5 ton. The predetermined magnitude may be determined based on the nature of the actuator to be tested. For example, the predetermined magnitude may be determined to be similar to or greater than a load expected to be experienced by the linear actuator to be tested during normal operation of that linear actuator. An aircraft spoiler actuator may typically experience suction loads of up to 5 ton, so a test force for testing such an actuator may have a magnitude of 5 ton or more. A predetermined time period during which the test force is continuously exerted may be in the range 5 minutes to 30 minutes. A predetermined time period during which the test force is continuously exerted may be at least 15 minutes. The predetermined time period may be determined based on the nature of the actuator to be tested. The predetermined time period may be determined such that if, during operation of the apparatus to test the linear actuator 100, the distance between the first and second surfaces of the test device changes during the predetermined time period, the operational effectiveness of the linear actuator 5 is deemed to be unacceptable, whereas if a distance change were to occurs after the predetermined time period has elapsed (assuming the test force continued to be exerted), the operational effectiveness of the linear actuator 100 would be deemed to be acceptable.

The test actuator 13 may be partly or fully integrated with the test device 10. The test actuator 13 may comprise any suitable type of linear actuator known in the art, such as a hydraulic actuator.

The measurement device 14 is for detecting a change in the distance between the first surface 11 and the second surface 12. The measurement device 14 may be configured to detect such a change, or may be configured to enable an operator of the apparatus 1 to detect such a change (e.g. by displaying information which enables the operator to detect such a change). For example, the measurement device 14 may be configured to detect such a change by measuring a parameter relating to a distance between the first surface 11 and the second surface 12. In some such examples the measurement device 14 detects whether the measured parameter exceeds a predetermined threshold. If the test actuator 13 is configured to exert the test force continuously for a time period, the measurement device may be configured to continuously measure the parameter during the time period, and to determine a time at which the measured parameter exceeds the predetermined threshold. If the test actuator 13 is configured to exert the test force continuously for a predetermined time period, the measurement device may be configured to measure the parameter at the end of the predetermined time period. The measured parameter may be any one of:

distance between the first surface and the second surface;
distance between a first selected point on the test device and a second selected point on the test device;
distance between a selected point on the first part of the linear actuator and a selected point on the second part of the linear actuator;
degree of extension of the one or more extendible members;
position of a selected point on the linear actuator;
position of a selected point on the test device;
position of a component of the test actuator.

The measurement device 14 may detect a change in the distance between the first surface 11 and the second surface 12 by detecting a change in the measured parameter. For example, the measurement device 14 may be configured to compare a first measured value of the measured parameter (e.g. obtained at a first time) with a second measured value of the measured parameter (e.g. obtained at a second, later time). If the second measured value is different to the first measured value, or differs by more than a predetermined threshold amount, then the measurement device 14 may be configured to determine that a change in the measured parameter has occurred. The measurement device 14 may be configured to register a positive detection of a change in the distance between the first surface 11 and the second surface 12 if it determines that a change in the measured parameter has occurred.

In some examples the measurement device 14 is partly or fully integrated with the test device 10. In some examples the measurement device 14 is partly or fully integrated with the test actuator 13. For example, the measurement device 14 may comprise a state detection mechanism of the test actuator 13, which is configured to detect an extension state of the test actuator 13. The measurement device 14 may comprise any suitable distance or position measuring system, which may be configured to measure relative distance or position of parts of the test actuator 13, parts of the test device 10, and/or parts of the linear actuator 100 that is being tested. In some examples the measurement device 14 may be relatively complex, for example including a controller configured to receive and process measured values. In other examples the measurement device 14 may be extremely simple. A simple measurement device 14 could comprise, for example, a scale (e.g. a ruler) arranged adjacent to the test device 10 to enable an operator to visually determine the distance between the first and second surfaces 11, 12.

Figure 2:
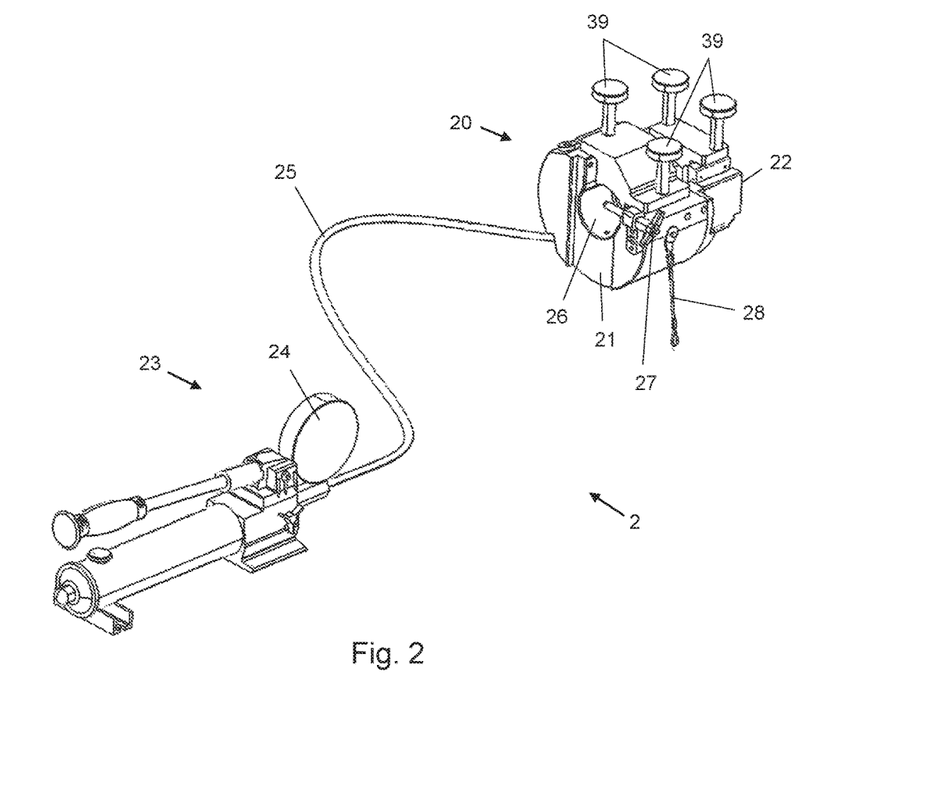
FIG. 2 shows a schematic view of a particular example apparatus for in-situ testing of a linear actuator.

FIG. 2 shows a particular example of an apparatus 2 according to the invention. The apparatus 2 comprises a test device 20, connected to a test actuator 23 and a measurement device 24. Like the test device 10 of the apparatus 1, the test device 20 comprises a first surface 21 which is configured to contact the first part 101 of the linear actuator 100 being tested, during operation of the apparatus 2, and a second surface 22 configured to contact the second part 102 of the linear actuator during operation of the apparatus 2. The second surface 22 is moveable relative to the first surface 21 to alter a distance between the first surface 21 and the second surface 22. The test device 20, test actuator 23 and measurement device 24 may have any or all of the features of the corresponding components of the apparatus 1 described above.

Figure 3A:
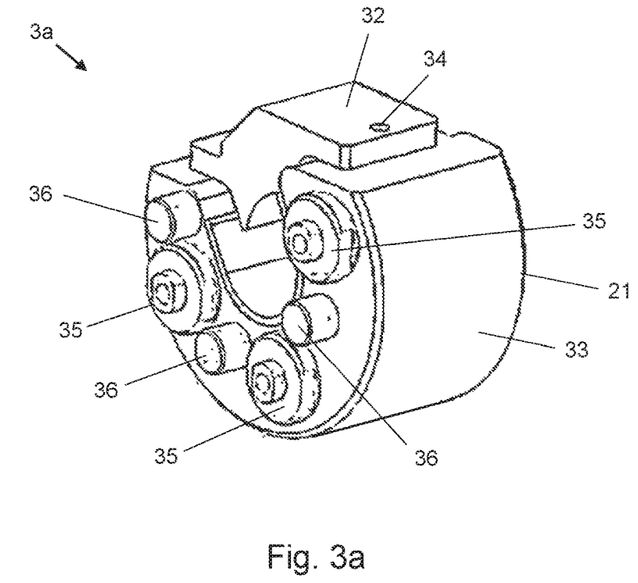
FIG. 3a shows a schematic view of an example force generating component of the apparatus of FIG. 2.
Figure 3B:
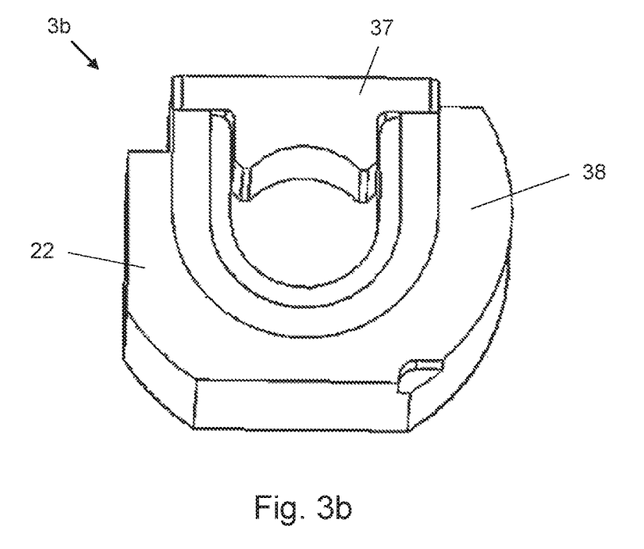
FIG. 3b shows a schematic view of an example load reacting component of the apparatus of FIG. 2.

The test device 20 comprises two separable components: a load reaction component 3b and a force generation component 3a. FIG. 3a shows the force generation component 3a in isolation and FIG. 3b shows the load reaction component 3b in isolation. The first surface 21 is comprised in the load reaction component 3b and the second surface 22 is comprised in the force generation component 3a. There is no attachment between the force generation component 21 and the load reaction component 22, however; the force generation component 21 and the load reaction component 22 are configured to be arranged on the linear actuator 100 such that they abut each other, and such that the force generation component 21 may exert a force on the load reaction component 22 to drive the first and second surfaces 21 and 22 apart.

Figure 6:
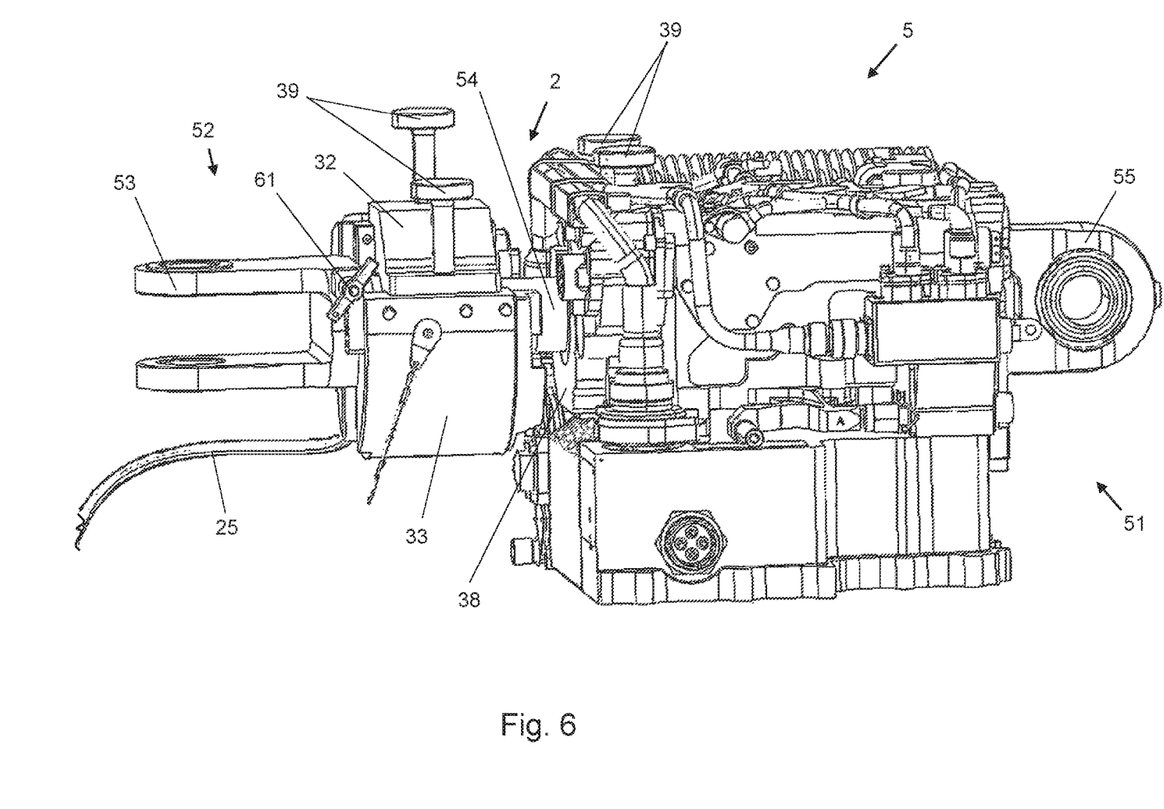
FIG. 6 shows a schematic view of the apparatus of FIG. 2 mounted on the linear actuator of FIG. 5.

The particular example apparatus 2 is configured to test a linear actuator which comprises an extending arm (such as the example linear actuator 100). The test device 20 is configured to enclose a cross-section of the extending arm during operation of the apparatus 1 to test the linear actuator. In particular, when in an operational configuration (as shown in FIG. 6), the test device 20 has a bore 26 which is shaped to receive the extending arm of the linear actuator to be tested. The shape and size of the bore 26 may match the cross-sectional shape and size of the extending arm. The force generating component 3a comprises a main part 33, which is approximately U-shaped such that it can be slotted on to the extending arm of the actuator, and a clamp part 32 which is attached to the main part 33 when the main part 33 is in place on the extending arm, to hold the force generating component 3a in place on the extending arm. In the illustrated example the clamp part includes holes 34 (only one is visible), which enable the clamp part 32 to be fixed to the main part 33 by bolts (screws) 39 (shown in FIG. 2). Similarly, the load reaction component 3b comprises a main part 38 and a clamp part 37. The bore 26 is formed partly by the main part of each component 3a, 3b, and partly by the clamp part of each component 3a, 3b. The main part and the clamp part of each component 3a, 3b may be configured such that attaching the clamp part to the main part has the effect of fixing the component in place on the extending arm (e.g. due to friction between the component and the extending arm), such that relative movement of the component and the extending arm is prevented.

The load reaction component 3b is configured to react a maximum actuation force exertable by the linear actuator. The load reaction component 3b may thereby function as a safety collar, to prevent the actuator (that is, the actuator which is being tested) from fully retracting during the testing process. The load reaction component 3b may be configured to contact one or more selected regions on the second part 105 of the actuator 100. In particular, the second surface 22 may be configured to contact one or more selected regions on the second part 105 of the actuator 100. The selected regions may be selected to prevent or reduce the risk of damage occurring to the second part 105 of the actuator due to a load exerted on it by the test device 20.

The load generation component 3a comprises one or more extendible members 36, which are connected to the test actuator 23 such that the test actuator 23 can drive extension of the one or more extendible members 36. In the illustrated example, the extendible members 36 comprise three extendible rods arranged to extend from a surface of the main part 33 of the load generation component 3a which is opposite to the first surface 21 and which abuts the load reaction component 3b during operation of the apparatus 2. When the test device 20 is arranged in an operational configuration on an actuator to be tested, the extendible members 36 are in contact with the load reaction component 3b such that loads may be transmitted from the load generation component 3a to the load reaction component 3b via the extendible members 36. When the test device 20 is arranged in the operational configuration, extension of the extendible members 36 increases the distance between the first surface 21 and the second surface 22.

The load generation component 3a may further comprise one or more load transfer features for transferring a load to the load generation component 3a from the load reaction component 3b. In the illustrated example, the load generation component 3a comprises three load transfer features 35 in the form of button interfaces. However; any other suitable type of load transfer feature could alternatively be used.

In the illustrated example, the load generation component 3a further comprises an optional rotation prevention mechanism in the form of a locking pin 27 (which in the particular example comprises a ball lock pin) and a lanyard 28. The locking pin 27 prevents rotation (relative to an actuator on which the load generation component 3a is arranged) of the force generation component item 3a and the lanyard 28 secures the locking pin 27. Alternatively, any other suitable mechanism for preventing rotation of the load generation component 3a could be used.

The test actuator 23 is configured to drive extension of the one or more extendible members 36. In the particular example, the test actuator 23 is a hand-operated hydraulic actuator, which is connected to the extendible members 36 by a hydraulic-fluid-filled tube 25. The measurement device 24 of the apparatus 2 is comprised in the test actuator 23, in the form of a pressure gauge integrated with the hydraulic actuator. The pressure value indicated by the pressure gauge correlates with the degree of extension of the extendible members 36, and therefore with the distance between the first and second surfaces 21, 22 of the test device 20. When the hydraulic actuator is exerting a force via the extendible members 36, an operator of the apparatus 20 may therefore detect a change in the distance between the first and second surfaces 21, 22 by observing the pressure values indicated by the pressure gauge (with a drop in the hydraulic pressure indicating an increase in the distance between the first and second surfaces 21, 22).

Figure 4:
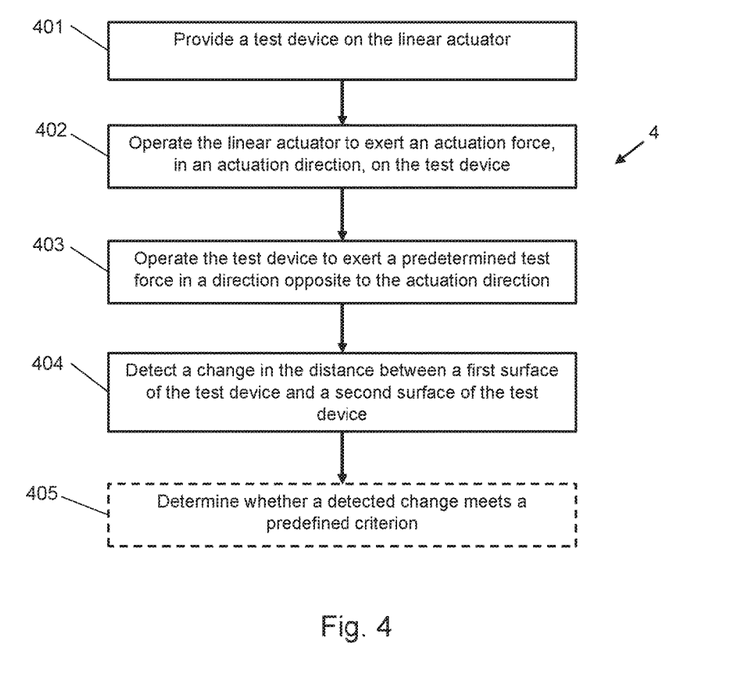
FIG. 4 is a flow chart of an example method for testing a linear actuator in-situ.

Operation of an example apparatus as described above for testing a linear actuator in-situ will now be described with reference to FIGS. 4-6. FIG. 4 is a flow chart that implements an example of a method 4 of testing of a linear actuator in-situ. Although the method 4 is described primarily with reference to the particular example apparatus 2, the method 4 may be performed using any apparatus according to the invention and the apparatus components referred to may have any of the features described above in relation to the example apparatus 1 or the example apparatus 2. Similarly, although the method 4 is described with reference to a particular example linear actuator 5 (shown in FIGS. 5 and 6), the method 4 may be used to test any linear actuator which is configured to exert an actuation force in an actuation direction by movement of a first part of the linear actuator relative to a second part of the linear actuator. The method can be performed with the actuator in its normal operating environment. For example, if the actuator being tested is an aircraft flight control surface actuator, the method 4 can be performed in the environment of the aircraft wing, with the actuator remaining connected to the flight control surface and to the wing structure.

In a first block 401, a test device of the apparatus is provided on a linear actuator. The test device is provided on the linear actuator such that, in an activated configuration of the linear actuator, the first surface of the test device contacts the first part of the linear actuator and the second surface of the test device contacts the second part of the linear actuator. The linear actuator may be put into a maintenance mode before the test device is provided on the linear actuator, e.g. by inserting a maintenance key into the linear actuator. The linear actuator may be manually extended such that it is not in a fully retracted configuration before the test device is provided on the linear actuator. The linear actuator may be manually retracted as far as possible when the test device has been provided on the linear actuator.

For the example apparatus 2 of FIGS. 2 and 3*a*-*b*, providing the test device 20 on a linear actuator comprises mounting the load reaction component 3*b* on the linear actuator by placing the main part 38 of the load reaction component 3*b* around the extending arm, sliding the main part 38 along the extending arm until the second surface 22 abuts a corresponding surface on the second part of the actuator (such sliding may not be necessary if the main part 38 can be placed in abutment with the second part 52 straight away), and then fixing the clamping part 37 to the main part 38 to fix the load reaction component 3*b* in place on the extending arm such that relative movement between the load reaction component 3*b* and the second part of the actuator is prevented.

Figure 5:
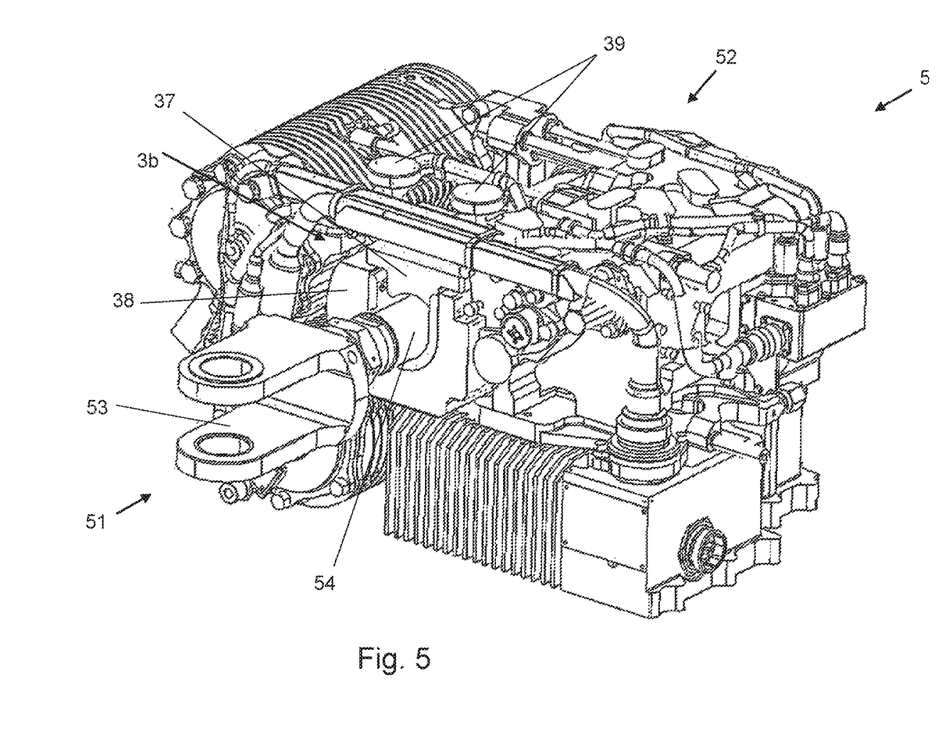
FIG. 5 shows a schematic view of the load reacting component of FIG. 3b mounted on an example linear actuator.

FIGS. 5 and 6 show an example linear actuator 5 during a process of providing the test device 20 on the linear actuator 5. The linear actuator 5 is for actuating an aircraft spoiler. The linear actuator 5 comprises a first part 51, a second part 52, and an extending arm 54 which may have any of the features of the corresponding components of the actuator 100 described above. The first part 51 comprises a first mounting feature 53, and the second part 52 comprises a second mounting feature 55 (visible in FIG. 6). The linear actuator 5 as shown in FIG. 5 is in a maintenance mode and has been manually put in a partially extended configuration. In FIG. 5, the load reaction component 3*b* has been mounted on the extending arm 54 of the linear actuator 5, but the force generation component 3*a* has not yet been mounted on the linear actuator 5. It can be seen that the configuration of the load reaction component 3*b* enables it to fit between the various structures of the second part 52 of the actuator 5, so as to contact a selected structure of the second part 52 that is suitable for reacting the loads generated by the apparatus 2 during a testing process.

Returning to block 401 of FIG. 4, providing the test device 20 on a linear actuator 5 further comprises mounting the force generation component 3*a* on the linear actuator 5. The force generation component 3*a* may be mounted on the linear actuator 5 after the load reaction component 3*b* has been mounted on the linear actuator 5. Similarly to the load reaction component 3*b*, the force generation component 3*a* can be mounted on the linear actuator 5 by placing the main part 33 of the force generating component 3*a* around the extending arm 54, sliding the main part 33 along the extending arm 54 until the first surface 21 abuts a corresponding surface on the first part 51 of the actuator 5 (such sliding may not be necessary if the main part 33 can be placed in abutment with the first part 51 straight away), and then fixing the clamping part 32 to the main part 33 to fix the force generating component 3*a* in place on the extending arm 54 such that relative movement between the force generating component 3*a* and the first part 51 of the actuator 5 is prevented. At this point there is a gap between the force generating component 3*a* and the load reaction component 3*b*, due to the partially extended state of the linear actuator 5. The linear actuator 5 is manually retracted until the force generating component 3*a* abuts the load reaction component 3*b*.

FIG. 6 shows the linear actuator 5 after the force generating component 3*a* has been mounted on the linear actuator, but before the linear actuator 5 has been manually retracted to bring the force generating component 3*a* into abutment with the load reaction component 3*b*.

In a second block 402, the linear actuator is operated to exert the actuation force on the test device. The actuation force is to reduce the distance between the first part of the linear actuator and the second part of the linear actuator, such that the actuation force compresses the test device. Operating the linear actuator to exert the actuation force on the test device may comprise activating a locking mechanism of the linear actuator (that is, a mechanism to hold the linear actuator in a selected state of extension). The linear actuator may be changed from the maintenance mode to an operational mode in order to perform block 402, e.g. by removing the maintenance key. In the example illustrated by FIGS. 5 and 6, the linear actuator 5 is a hydraulic actuator and operating the linear actuator 5 to exert the actuation force comprises pressurizing a hydraulic circuit of the linear actuator 5. The actuation force exerted by the example linear actuator 5 is 15 ton. The linear actuator 5 has an antiextension locking mechanism, so this mechanism is activated and the hydraulic circuit is depressurized.

In block 403, the test device is operated to exert a predetermined test force in a direction opposite to the actuation direction. The test force is to increase the distance between the first surface and the second surface of the test device. The test force may have any or all of the features described above in relation to the apparatus 1 or the apparatus 2. Operating the test device to exert a predetermined test force may comprise activating or operating a test actuator connected to or comprised in the test device. The predetermined test force may have a predetermined magnitude and/or direction. Operating the test device to exert a predetermined test force may comprise operating the test device to continuously exert the test force for a predetermined time period. In the particular example illustrated by FIGS. 5 and 6, operating the test device 20 to exert a predetermined test force comprises manually pressurizing a hydraulic circuit comprising the test actuator 23 and the extendible members 36. The hydraulic circuit is pressurized to a suitable pressure such that the extendible members exert a test force of 5 ton on the reaction component 3b. The test force acts to increase the distance between the first surface 21 and the second surface 22 of the test device 20, and thereby to increase the distance between the first and second parts 51, 52 of the linear actuator 5. The hydraulic circuit is maintained in a pressurized state for a predetermined time period of 15 minutes, such that the test force is exerted continuously during the predetermined time period.

In block 404, a change in the distance between the first surface and the second surface of the test device is detected. Detecting a change in the distance between the first surface and the second surface may be performed in any of the manners described above in relation to the example apparatus 1 or the example apparatus 2. For example, detecting a change in the distance between the first and second surfaces may comprise measuring a parameter relating to the distance between the first and second surfaces. A parameter relating to the distance between the first and second surfaces may be monitored over a time period. Block 404 may be performed at least partly automatically, e.g. by a controller comprised in the apparatus. Alternatively, block 404 may be performed manually, by an operator of the apparatus.

In the example illustrated by FIGS. 5 and 6, a change in the distance between the first and second surfaces 21, 22 of the test device 20 is detected by an operator of the apparatus 2 monitoring the pressure in the hydraulic circuit (using the pressure gauge 24 comprised in the test actuator 23) during the time period for which the hydraulic circuit is maintained in a pressurized state. A drop in the pressure in the hydraulic circuit indicates an increase in the distance between the first and second surfaces 21, 22 of the test device 20, and therefore an increase in the distance between the first and second parts 51, 52 of the linear actuator 5. If any such distance increase occurs during the time period for which the test force is continuously exerted, it indicates that the linear actuator 5 (in particular, a locking mechanism of the linear actuator 5) is not operating at full effectiveness.

The method 4 may optionally comprise a further block 405, in which it is determined whether a detected distance change meets a predefined criterion. The predefined criterion may be defined such that if a detected change meets the predefined criterion, the operational effectiveness of the linear actuator is unacceptable, and if the detected change does not meet the predefined criterion, the operational effectiveness of the linear actuator is acceptable. The predefined criterion may comprise, for example, one or more of: a threshold (e.g. minimum or maximum) time taken for a detected distance change to occur, a threshold (e.g. minimum or maximum) magnitude of a detected distance change; a threshold (e.g. minimum or maximum) time taken for a change in a parameter relating to the distance between the first and second surfaces of the test device to occur; a threshold (e.g. minimum or maximum) magnitude of a change in a parameter relating to the distance between the first and second surfaces of the test device. Block 405 may, in some examples, be performed automatically (e.g. by a controller of the apparatus). In other examples block 405 may be performed manually by an operator of the apparatus. In the example of FIGS. 5 and 6, determining whether a detected distance change meets a predefined criterion comprises an operator of the apparatus 2 determining whether a change in the hydraulic circuit pressure has occurred before a threshold maximum time has elapsed, and if such a change has occurred, determining whether a corresponding distance change is greater than or equal to a threshold minimum distance change. The threshold maximum time, in that example, is equal to the duration of the test period. The threshold minimum distance change, in the particular example, is 2 mm. Other threshold values may be used in other applications. In general, threshold values will be selected in dependence on the nature of the actuator being tested.

Figure 7:
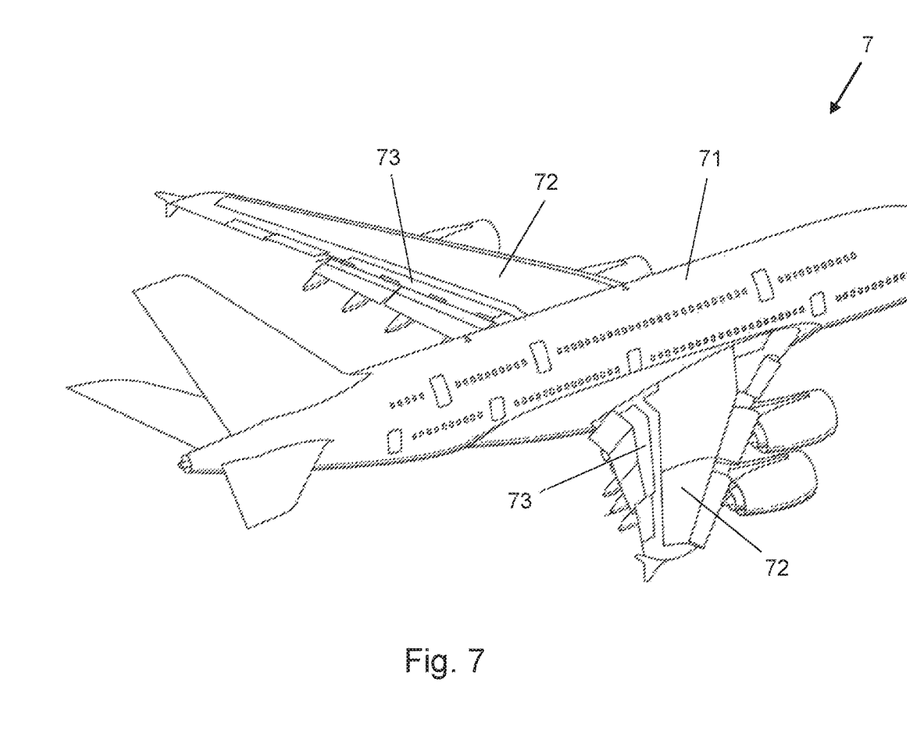
FIG. 7 shows a schematic view of an example aircraft comprising a linear actuator.

FIG. 7 shows a schematic top view of an example of an aircraft 7 according to the invention, which comprises a fuselage 71 and a pair of wings 72. Each wing 72 is provided with multiple flight control surfaces, including a plurality of spoilers 73. Each of the spoilers 73 is actuated by a linear actuator (not visible), as are various ones of the other flight control surfaces. Each linear actuator may have any or all of the features of the linear actuators 100, 5, described above. The aircraft 7 further comprises an apparatus (not visible) for in-situ testing of the linear actuators. The apparatus may have any or all of the features of the apparatus 1, 2, described above. A test device of the apparatus is mounted on one of the linear actuators such that in an activated configuration of the linear actuator a first surface of the test device contacts a first part of the linear actuator and a second surface of the test device, which is moveable relative to the second surface of the test device in the actuation direction, contacts a second part of the linear actuator which is moveable relative to the first part.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An apparatus for in-situ testing of a linear actuator configured to exert an actuation force in an actuation direction by movement of a first part of the linear actuator relative to a second part of the linear actuator, wherein the apparatus comprises:
   a test device comprising a first surface configured to contact the first part of the linear actuator during operation of the apparatus, and a second surface configured to contact the second part of the linear actuator during operation of the apparatus, wherein the second surface is moveable relative to the first surface to alter a distance between the first surface and the second surface;
   a test actuator coupled to the test device and configured to exert a test force in a direction opposite to the actuation direction when the apparatus is in use to test the linear actuator, the test force being to drive movement of the second surface away from the first surface; and
   a measurement device for detecting a change in the distance between the first surface and the second surface, wherein the measurement device is integrated with the test device and/or the test actuator.

2. The apparatus of claim 1, wherein the linear actuator comprises an extending arm, and wherein the test device is configured to enclose a cross-section of the extending arm during operation of the apparatus to test the linear actuator.

3. The apparatus of claim 1, wherein the test device comprises a load reaction component and a force generation component, and wherein the first surface is comprised in the load reaction component and the second surface is comprised in the force generation component.

4. The apparatus of claim 3, wherein the load reaction component is configured to react a maximum actuation force exertable by the linear actuator.

5. The apparatus of claim 3, wherein the force generation component comprises one or more extendible members connected to the test actuator, wherein the one or more extendible members are in contact with the force reaction component such that forces are transmissible from the force generation component to the force reaction component via the one or more extendible members,
   wherein extension of the one or more extendible members increases a distance between the first surface and the second surface, and
   wherein the test actuator is configured to drive extension of the one or more extendible members.

6. The apparatus of claim 1, wherein the test actuator is configured to exert the test force according to at least one predetermined parameter, wherein the at least one predetermined parameter includes one or more of:
   a magnitude of the test force;
   a direction of the test force;
   a time period during which the test force is continuously exerted.

7. The apparatus of claim 1, wherein the test actuator comprises a hydraulic actuator.

8. The apparatus of claim 1, wherein the first surface is configured to seat on a surface on the first part contacted by the first surface during operation of the actuator, and the second surface is configured to seat on a surface on the second part contacted by the second surface during operation of the actuator.

9. The apparatus of claim 1, wherein the measurement device is configured to measure a parameter relating to a distance between the first surface and the second surface.

10. The apparatus of claim 9, wherein the measurement device is configured to detect whether the measured parameter exceeds a predetermined threshold.

11. The apparatus of claim 10, wherein the test actuator is configured to exert the test force continuously for a time period and the measurement device is configured to continuously measure the parameter during the time period, and wherein the measurement device is further configured to determine a time at which the measured parameter exceeds the predetermined threshold.

12. The apparatus of claim 9, wherein the test actuator is configured to exert the test force continuously for a predetermined time period, and the measurement device is configured to measure the parameter at the end of the predetermined time period.

13. The apparatus of claim 9, wherein the parameter is any one of:
   distance between the first surface and the second surface;
   distance between a first selected point on the test device and a second selected point on the test device;
   distance between a selected point on the first part of the linear actuator and a selected point on the second part of the linear actuator;
   degree of extension of the one or more extendible members;
   position of a selected point on the linear actuator;
   position of a selected point on the test device;
   position of a component of the test actuator.

14. An apparatus in combination with a linear actuator;
   wherein the linear actuator comprises a first part moveably connected to a second part, and is configured to exert an actuation force in an actuation direction by movement of the first part relative to the second part; and
   wherein the apparatus is configured for in-situ testing of the linear actuator and comprises:
   a test device mounted on the linear actuator such that in an activated configuration of the linear actuator a first surface of the test device contacts the first part of the linear actuator and a second surface of the test device, which is moveable relative to the second surface of the test device in the actuation direction, contacts the second part of the linear actuator;
   a test actuator coupled to the test device and configured to exert a test force in a test direction opposite to the actuation direction, the test force being to drive movement of the second surface away from the first surface; and
   a measurement device for detecting a change in the distance between the first surface and the second surface, wherein the measurement device is integrated with the test device and/or the test actuator.

15. The apparatus in combination with a linear actuator according to claim 14, wherein the actuation force is to reduce the distance between the first part of the linear actuator and the second part of the linear actuator, such that the actuation force compresses the test device.

16. The apparatus in combination with a linear actuator according to claim 14, wherein the linear actuator is configured to actuate a flight control surface of an aircraft, and wherein one of the first and second parts of the linear actuator is connected to a fixed structure of an aircraft, and the other of the first and second parts of the linear actuator is connected to the flight control surface.

17. An aircraft comprising the apparatus in combination with a linear actuator according to claim 14.

18. A method of testing of a linear actuator in-situ, wherein the linear actuator is configured to exert an actuation force in an actuation direction by movement of a first part of the linear actuator relative to a second part of the linear actuator, the method comprising:
   providing a test device on the linear actuator such that, in an activated configuration of the linear actuator, a first surface of the test device contacts the first part of the linear actuator and a second surface of the test device contacts the second part of the linear actuator;
   operating the linear actuator to exert the actuation force on the test device;
   operating the test device to apply a predetermined test force in a direction opposite to the actuation direction, the test force being to increase the distance between the first surface and the second surface; and
   detecting a change in a distance between the first surface and the second surface.

19. The method of claim 18, further comprising determining whether a detected change meets a predefined criterion, wherein the predefined criterion comprises one of:
   a minimum distance change during a predetermined time period; and
   a maximum time to reach a predetermined distance change.

* * * * *